United States Patent
Werntz

[15] 3,643,788
[45] Feb. 22, 1972

[54] ACCUMULATION LIVE ROLLER CONVEYOR

[72] Inventor: Charles W. Werntz, Ferguson, Mo.
[73] Assignee: Alvey Inc., St. Louis, Mo.
[22] Filed: July 6, 1970
[21] Appl. No.: 52,286

[52] U.S. Cl. .......................................................198/127 R
[51] Int. Cl........................................................B65g 13/02
[58] Field of Search ................198/127, 127 E, 192, 34, 203; 193/35

[56] References Cited

UNITED STATES PATENTS

| | | | |
|---|---|---|---|
| 3,012,652 | 12/1961 | Poel et al. | 198/127 R |
| 3,537,569 | 11/1970 | Leach | 198/127 R |
| 2,129,510 | 9/1938 | Taylor | 198/127 R |

Primary Examiner—Richard E. Aegerter
Assistant Examiner—Alfred N. Goodman
Attorney—Gravely, Lieder & Woodruff

[57] ABSTRACT

A live roller conveyor provided with a series of driving units and drive transfer wheels for delivering power to groups of article supporting and conveying rollers a power delivery belt drive connected to all of the driving units, and an article sensing conveying roller located downstream from a preceding drive unit to sense the continued presence of an article thereon and respond by disabling the associated driving unit so that trailing articles are not caused to exert pressure on leading articles should blockage of a leading article occur.

8 Claims, 5 Drawing Figures

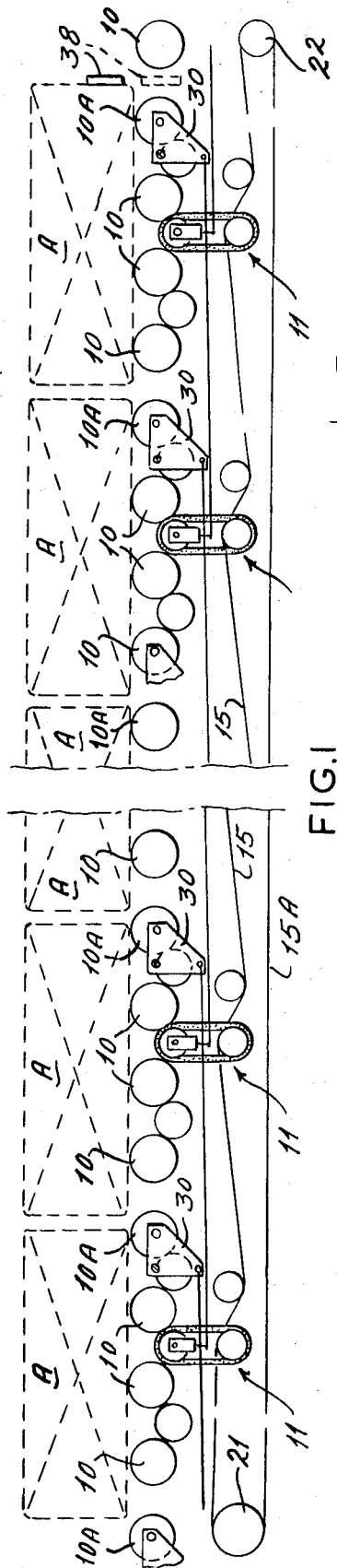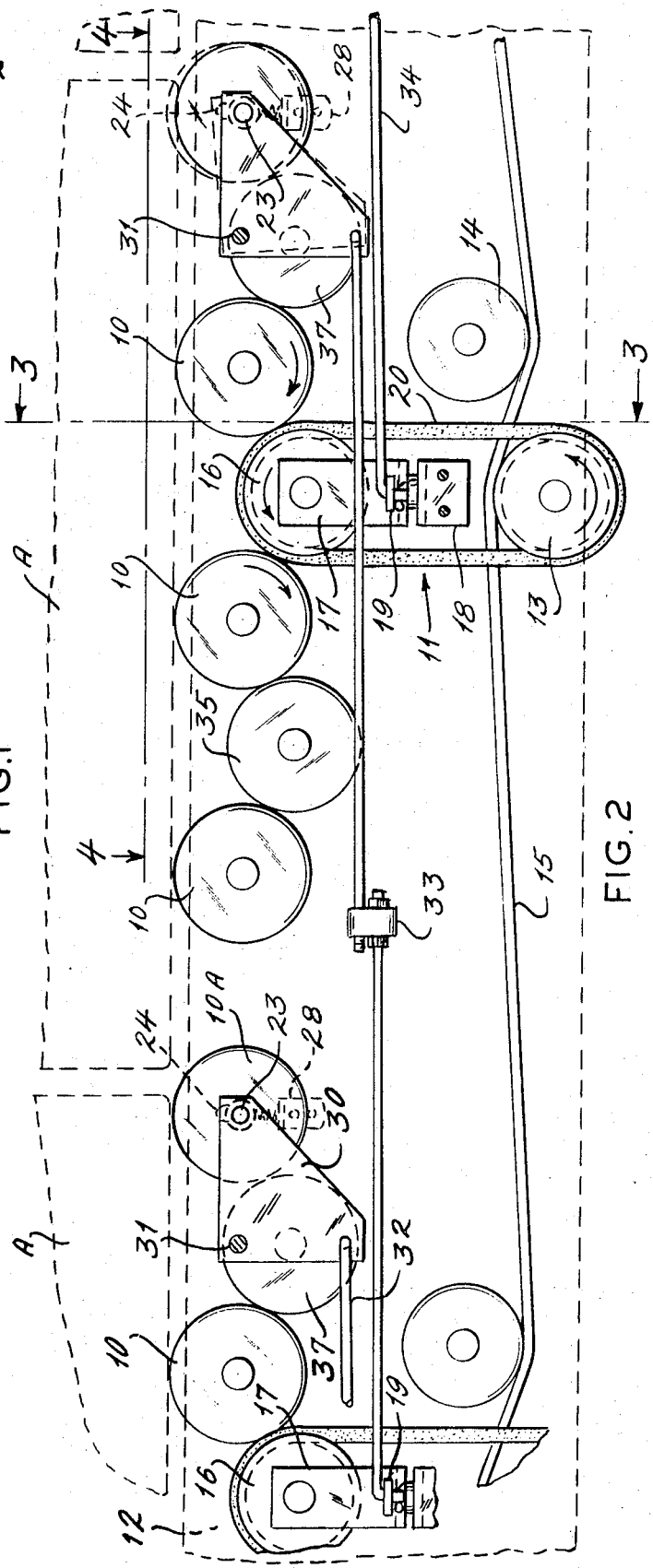
FIG.1
FIG.2

ACCUMULATION LIVE ROLLER CONVEYOR

BRIEF DESCRIPTION OF THE INVENTION

This invention relates to improvements in roller conveyors having power operated driving units spaced along the length of the conveyor run to effect rotation of the rollers and transport articles from roller to roller without gravity assistance.

The problem in live roller conveyors is to control the forward pressure of article accumulation when the leading article in a stream of moving articles is blocked in its forward travel. For a variety of reasons it is desirable to block the travel of articles on a live roller conveyor at some point or points along its run so that work may be performed on an article, or an article may be removed. When an article is blocked, the backup or in-line accumulation of articles back of the blocking point generates forces of a magnitude proportional to the number of articles backed up behind the block point. Problems encountered from this blockage in in-line live roller conveyors are many, as, for example, the difficulty of removing an article being pressed upon by trailing articles, the possibility of crushing articles, and the load imposed on the conveyor driving motor.

It is an important object hereof to provide the basic requirements of conventional live roller conveyors and to incorporate means for automatically deenergizing the power supply to drive the rollers at a predetermined distance upstream from a blocking point. It is a further object to arrange a live roller conveyor with means to develop a predetermined gap or spacing between in-line articles so that forward pressure of a stream of articles may be avoided.

Other objects are to automatically energize the article-advancing rollers to move articles into any and all gaps or spaces which are at least greater than the predetermined amount of space created upon removal of an article, and to accomplish this at any one or more points along the conveyor. A further object is to accomplish the foregoing objects when the conveyor is transporting a variety of articles of mixed weight.

The foregoing objects are accomplished by a series of localized driving units which are automatically controlled, either power on or power off, by a sensing roller located at a predetermined distance downstream from each driving unit. The sensing roller is activated by the presence or absence of articles at its location, and operates to control the power delivery from the driving unit with which each is operatively associated.

BRIEF DESCRIPTION OF THE DRAWINGS

A preferred embodiment of the invention is disclosed in the apparatus illustrated in the accompanying drawings, wherein:

FIG. 1 is a fragmentary and schematic longitudinal elevation of a live roller conveyor assembly incorporating the means and agencies of the invention;

FIG. 2 is a greatly enlarged fragmentary portion of the conveyor assembly seen in FIG. 1;

DESCRIPTION OF THE APPARATUS

Figure 3:
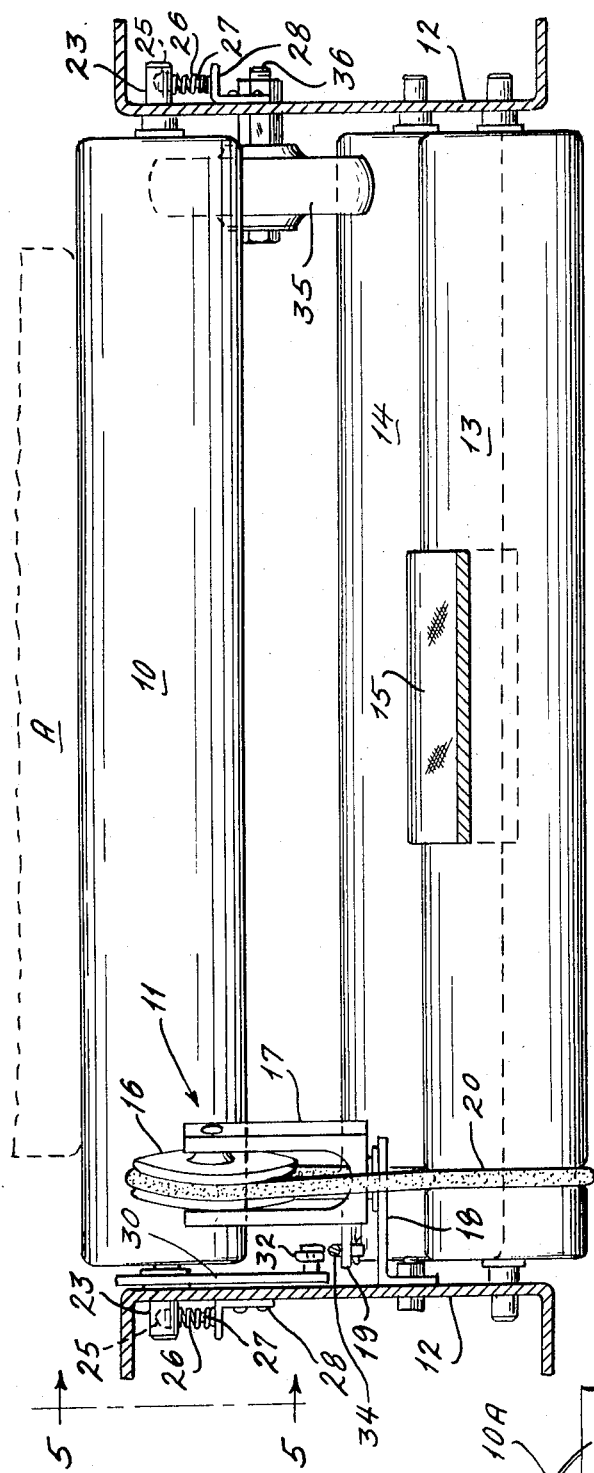
FIG. 3 is a sectional view taken at line 3—3 in FIG. 2.

In FIG. 1 there has been shown schematically an elevational view of the salient components of the present invention as applied to the accumulation live roller conveyor apparatus. The apparatus is made up of a series of article conveying rollers 10 arranged in a regular spacing so that the articles A move along on the tops of the rollers. At predetermined spacing along the run of the rollers 10 there are individual driving units 11 mounted adjacent one of the conveyor frame side members 12. The driving units 11 include a power input roll or wheel 13 working in conjunction with a suitable snubber 14 to be engaged by the power delivery run or pass of a flexible drive member 15. The return or idle pass of the drive member is seen at 15A in FIG. 1. Drive member 15 is shown as a flat belt engaged on the elongated roll 13, and the snubber 14 is a roll similar to roll 13. A V-belt or a chain drive may be used also.

Figure 4:
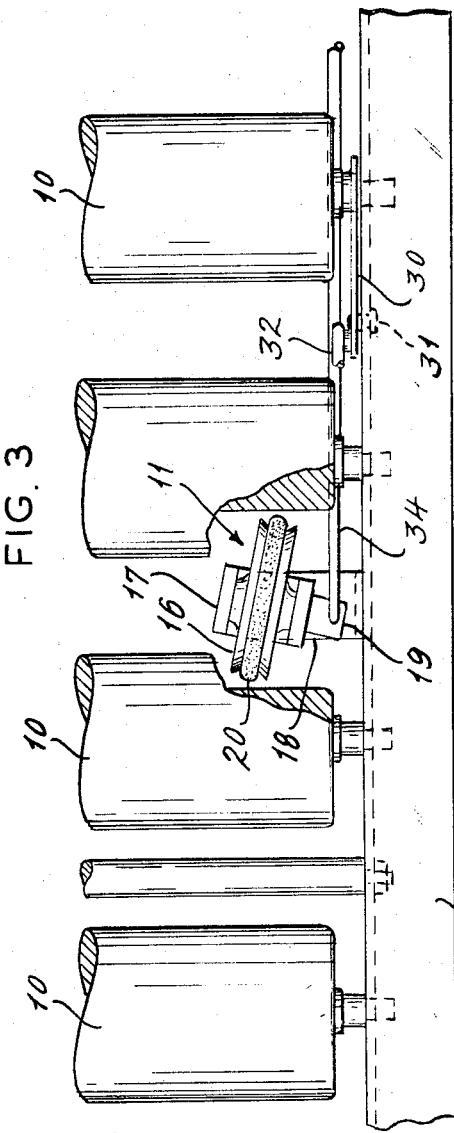
FIG. 4 is another fragmentary view in plan of the conveyor as seen at line 4—4 in FIG. 2.

In FIGS. 2, 3 and 4 each drive unit 11 is seen to include, in addition to the power input roll 13, an idler wheel 16 which is rotatably mounted in a fork 17 mounted for turning or swiveling movement on a bracket 18 fixed to the inside face of the adjacent side member 12 (FIGS. 3 and 4). The base portion of the swivel fork 17 is provided with an arm 19 for a purpose to appear. The power input roll 13 is suitably circumferentially grooved, as is the idler wheel 16, to receive a friction belt 20. The belt 20 is installed with sufficient tension to prevent slippage and to be effective to retain the idler wheel 16 normally in a plane with its axis of rotation substantially aligned with the fixed axis of the power input roll 13. Should the wheel 16 be moved to a position with its axis at an angle to the axis of roll 13, the belt 20 will be twisted and stretched so it will want to automatically return the wheel 16 to its normal position, as is seen in FIGS. 3 and 4.

The normal position of the wheel 16 is such that it holds the belt 20 in frictional driving contact with two adjacent article conveying rollers 10 at zones below the horizontal diameter of the rollers (FIG. 2). The drive member 15 has its power pass moving from right to left in FIGS. 1 and 2 so that the rollers 10 will rotate in a clockwise sense to transport the articles A from left to right as viewed in FIGS. 1 and 2. In this drive arrangement the drive member 15 is provided with a power input pulley 21 and an idler pulley 22.

Figure 5:
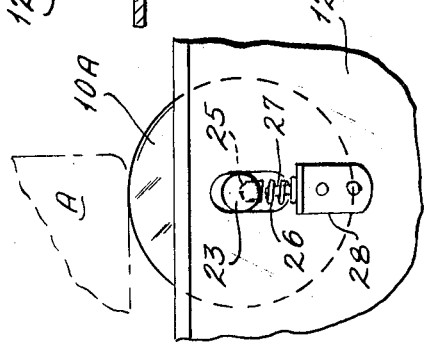
FIG. 5 is a fragmentary view of a typical detail of the apparatus seen at line 5—5 in FIG. 3.

Means is provided to control the angular position of the wheel 16 with the result that the wheel 16 and belt 20 act as a clutch relative to rollers 10, with the arm 19 used for declutching and the resilient restoring action of the belt 20 to return itself to a flat or nearly common plane from a twisted plane condition. The control includes a sensing roller 10A which is every fourth roller in the series of rollers shown in FIGS. 1 and 2. The rollers 10A are mounted with the shaft 23 movable in a vertically elongated slot 24 (FIGS. 2 and 5) in the side members 12. The ends of each shaft 23 are formed with sockets 25 to receive the upper end of compression spring 26. The bottom end of the spring 26 is seated over a guide pin 27 on the surface of a bracket 28 fixed to the outside surface of both side members 12. The springs 26 are tensioned to normally hold the associated roller 10A elevated in the slots 24 so its top surface is above the surface of the other adjacent rollers 10 a sufficient distance to be knocked down when an article A comes along, as is shown by the dotted outlines in FIG. 2.

The control means also includes a motion transfer lever system at one frame side member 13 corresponding to the location of the driving unit 11. The lever system is made up of a pivoted plate 30 movable about a pin 31 (FIG. 4) and positioned with the shaft 23 of the sensing roller 10A engaged therewith. A link 32 is connected to the plate 30 below its pivot axis so that vertical motion of the roller shaft 23 will be converted into horizontal motion at link 32. Of course, any suitable lever system may be employed. The link 32 (at the right side in FIG. 2) extends upstream from the pivoted plate 30 and bypasses the nearest driving unit 11. The end of link 32 is connected by a suitable length adjusting device 33 to a second link 34. The second link 34 is operatively connected to the arm 19 on the swivel fork 17 for the idler wheel 16.

In operation, the springs 26 (FIG. 3) lift the sensing rollers 10A above rollers 10 so an article A moving to the right, due to the drive imparted to rollers 10 from the units 11, will depress each roller 10A in turn and actuate the links 30, 32 and 34 to declutch units 11 associated therewith by rotating the swivel fork 17 in a clockwise (FIG. 4) sense.

The respective drive units 11 supply the power drive for the two most adjacent rollers 10. The rotation of the left hand roller 10 (FIG. 2) is picked up on the opposite side of the conveyor frame from unit 11 (FIG. 3) by a drive transfer friction wheel 35 rotating on a fixed shaft 36 in the side frame 12. In a similar manner a second drive transfer wheel 37 is driven by the right hand roller 10 (FIG. 2) and is contacted by the sensing roller 10A whenever this roller is depressed by an article A. Each drive unit 11 is coupled by its nearest rollers 10 to the transfer wheels 35 and 37 so that the next adjacent rollers 10 and 10A respectively are driven when engaged thereby. Thus, the conveyor shown in FIG. 1 is arranged with the rollers for conveying articles A in groups of three fixed shaft rollers 10 and one movable shaft sensing roller 10A. Each group of rollers has its driving unit 11, and the sensing roller 10A of a leading group of rollers is back-connected to a driving unit 11 downstream. The drawings show the back-connection made to the second adjacent downstream driving unit 11 from the first adjacent unit 11, but this may be varied as desired by increasing the length of the links 32 and 34.

THE OPERATION

The apparatus described is understood to comprise a run or stretch of live rollers in which every fourth roller is normally slightly elevated above the others. Before any articles are fed onto the apparatus, the start up of the power to drive belt roller 21 (FIG. 1) will actuate the respective power input wheels or rollers 13 of each unit 11. This action will result in rotation of each idler wheel 16, and since each sensing roller 10A is elevated by springs 26 (FIGS. 3 and 5), the idler wheels 16 will hold the belt 20 in contact with the adjacent rollers 10. Thus, all the rollers 10 will be driven and become live rollers, but sensing rollers 10A will not be driven. Now as a single article A is placed on the live rollers it will be moved by the rollers 10 to pass over the successive sensing rollers 10A, because as the article depresses each sensing roller 10A that action will declutch, not the immediate group of rollers 10 and 10A on which it is resting, but the group of rollers 10 and 10A which it has just passed over. Thus a leading article will momentarily cut off the drive to a trailing article.

In FIG. 1 it is seen that a column of articles A is carried on the rollers 10 and 10A and that the leading article A at the right is blocked in its travel by stop means 38 which has been moved up from its retracted position. The driving unit 11 directly under the blocked article A is operatively engaged so that its associated rollers 10 and 10A are powered by the endless means 15 driving the roller 13, belt 20 and wheel 16, as described. The sensing roller 10A adjacent the stop 38 is depressed and has declutched the first drive unit 11 downstream from the drive unit 11 directly under the blocked article. By this declutching action the next following article is deprived of an impelling or advancing drive and it does not press on the blocked article. As each succeeding article approaches the articles held up by the stop 38 it will lose its driving force because the rollers 10 and 10A on which it rests will not be powered.

When the stop 38 is removed the blocked article A will immediately move on because it is sitting on rollers 10 and 10A which are powered. As the right-hand sensing roller 10A (FIG. 1) is allowed to raise up it actuates the associated driving unit 11 to reconnect rollers 10 and 10A so the next article A begins to advance. This action progresses throughout the articles stacked up or accumulated to the left of the stop 38; and all articles will advance with a desired spaced between each.

It is a feature of the conveyor that as a series of articles A advance along the rollers 10 the lead article will one-by-one depress the sensing rollers 10A to declutch the driving unit 11 behind it. The advancing lead article is at this time on rollers 10 and 10A that are driven so it moves on until it clears the sensing roller 10A which reengages driving unit 11 connected thereto to advance the next article. In this way a series of articles are moved on the conveyor with spaces therebetween, which spaces are determined by the forward momentum developed as the articles tend to glide over the respective driving units 11 which are alternately actuated to drive and discontinue driving the groups of rollers 10 and 10A.

A preferred form of apparatus has been described herein for the purpose of disclosing the principles of the invention and one way by which those principles may be commercially used, but other apparatus may perform in like manner.

What is claimed is:

1. In article conveying apparatus, the combination of a series of groups of article conveying rollers arranged to support articles for movement along the tops of said rollers from group to group; a drive belt directed along beneath said conveying rollers and spaced therefrom; and a driving unit adjacent each group of rollers including a pair of vertically spaced rotatable members, a friction belt trained about both members, one of said members being disposed adjacent to rollers in said group with said friction belt contacting at least one of said rollers, and the other of said members being engaged in driving relation with said drive belt to drive said friction belt and said article conveying rollers contacted thereby.

2. The combination set forth in claim 1 wherein control means is connected to said one rotatable member to angularly move said one member relative to the said other member for discontinuing the friction belt drive to said article conveying rollers.

3. The combination set forth in claim 1 wherein each group of rollers includes said friction belt contacted rollers and other rollers spaced therefrom, and drive transfer means in driving contact with one of said belt contacted rollers and said other rollers.

4. The combination set forth in claim 1 wherein one of said pair of spaced rotatable members is relatively movable between a position in which said friction belt runs in a single plane and a position in which said friction belt is twisted out of said single plane.

5. The combination set forth in claim 1 wherein said one of said rotatable members is relatively fixed with its axis of rotation parallel to said article conveying rollers and the other said rotatable member is positionable with its axis of rotation selectively parallel and nonparallel to the other said rotatable member.

6. In article conveying apparatus, the improvement which includes a series of article transporting rollers, means operatively supporting certain rollers in said series to project above the remaining rollers, a source of power for driving all of said rollers, a plurality of power transfer means, each operatively connected between said source of driving power and a predetermined group of said rollers, each of said power transfer means including a fixed axis rotary member and a swivel axis rotary member in spaced relation, and drive belt means trained over each member, said belt means being effective normally to retain said swivel axis rotary member in a roller driving position with its axis substantially parallel with the axis of said fixed rotary member, each of said transfer means being selectively operable to connect and disconnect said source of power from a predetermined group of rollers, and means connecting each of said projecting rollers with a selected one of said power transfer means to effect the selective operation thereof in which an article depressing a projecting roller disconnects the power source from the associated predetermined group of rollers.

7. The apparatus of claim 6 wherein said means connecting each of said projecting rollers with a selected one of said power transfer means is directly connected to said swivel axis rotary member to swivel the latter out of its normal position to disconnect the drive to said rollers.

8. In article conveying apparatus, the improvement which includes a series of article transporting rollers defining an article conveying path and arranged with fixed axes of rotation, a series of article sensing rollers distributed through said fixed axis rollers and being movable from a first position above said article conveying path into a second position in said article conveying path, a source of power spaced beneath but for rotating said fixed axis rollers, a plurality of power transfer means operatively disposed between said source of power and certain of said fixed axis rollers and normally in power transfer connection with both said power source and said fixed axis rollers, each power transfer means having a pair of rotary pulleys and a friction belt trained thereover and means operatively connecting each of said article sensing rollers with one of said pulleys in said power transfer means, said connecting means angularly turning said one pulley to a position disconnecting the power to said certain of said fixed axis rollers upon an article engaging and moving a sensing roller into its said second position.

\* \* \* \* \*